Nov. 17, 1970 G. DIRKS 3,541,307

SELECTION CIRCUIT

Original Filed Aug. 26, 1957 4 Sheets-Sheet 1

INVENTOR
Gerhard Dirks
BY Michael S. Striker
ATTORNEY

INVENTOR
Gerhard Dirks
BY Michael S. Striker
ATTORNEY

Nov. 17, 1970 G. DIRKS 3,541,307

SELECTION CIRCUIT

Original Filed Aug. 26, 1957 4 Sheets-Sheet 3

INVENTOR
Gerhard Dirks
BY
ATTORNEY

Nov. 17, 1970 G. DIRKS 3,541,307

SELECTION CIRCUIT

Original Filed Aug. 26, 1957 4 Sheets-Sheet 4

INVENTOR
Gerhard Dirks
BY
Michael S. Striker
ATTORNEY 3,541,307
SELECTION CIRCUIT
Gerhard Dirks, 12120 Edgecliff Place,
Los Altos Hills, Calif. 94022
Original application Aug. 26, 1957, Ser. No. 680,207, now Patent No. 3,223,979, dated Dec. 14, 1965. Divided and this application Oct. 23, 1965, Ser. No. 503,919
Claims priority, application Great Britain, Aug. 24, 1956, 25,885/56
Int. Cl. B41j 5/38; G06k 3/00, 7/016
U.S. Cl. 235—61.6 3 Claims

ABSTRACT OF THE DISCLOSURE

The function of the selection circuit is to operate one of a number of, for example, keys, in response to input signals derived, for example, from a tape. It consists of a matrix having a first group of conductors and a second group of conductors and interconnecting circuits, each interconnecting one of the first group of conductors with one of the second group of conductors. Each interconnecting circuit consists of a series connection of a diode and, for example, a relay coil if each key is operable both by such a coil. The input signals are used to activate electronic switches. Each input signal causes the activation of a first electronic switch connecting one of the first group of conductors to a voltage source and a second electronic switch connecting one of the second group of conductors to another terminal causing current to flow through the coil of the interconnecting circuit connecting the first selected conductor to the second selected conductor. The current flow through the coil causes activation of the selected key.

This is a division of my copending application Ser. No. 680,207, filed Aug. 26, 1957 now U.S. Pat. 3,223,979.

The present invention relates to a control means for the actuation of selectively-operable machines such as keyboard and the like machines. A control means of this type would be operative between an input means for signals, such as a punched tape, punched cards, magnetic tape or other magnetic records, and a selectively-operable assembly such as might normally be operated from a keyboard, the components of which assembly are to be selected and operated in dependence on input signals sensed at said input means, thus furnishing visual output signals corresponding to said input signals.

An important use of the invention is in the operation of a line-composing machine, for example from a punched tape.

It is one object of the invention to provide an improved form of controllable delay means for effecting or not effecting, as desired, a delay between two successive sensings of input signals. In a line-composing machine, for example, as is well known, a delay might be required for any of the following reasons, among others:

(a) The machine requires longer time to operate when succeeding signal combinations are identical than when they are not identical;

(b) If a line has to be justified, time is required for this before the setting of the next line begins;

(c) In cases where there are several magazines, having different type faces, time is required to make a selection when another type face is to be used; and (d) Time is required, in differing amounts, to operate the elevator at the ending of a line and to prepare the machine for a new line.

It is therefore an object of the invention to provide an electrical means for effecting this delay.

It is a further object of the invention to provide in some cases an electrical means whereby the length of the delay is preselected and operates without reference to the state of the machine at the time.

It is a still further object of the invention to provide in other cases an electrical means whereby the length of the delay is dependent on the time taken by the machine to complete the function then in progress.

It is another object of the invention to provide an improved means for selecting from an assembly of operating elements, the particular element to be operative at the time, by having these elements disposed in a crosswise arrangement and by making the selection from two directions in dependence on two components or symbols by which that particular element is represented.

The preceding object may be further developed in that each such element is represented by a number of two or more denominations, and in that a selection in one direction is dependent on one or some of those denominations while the selection in the other direction is dependent on the remaining denomination or denominations.

In accordance with one feature of the present invention, windings or magnet coils in a crosswise arrangement, for example of vertical and horizontal rows, or of radial and circumferential rows, are selected by counting a predetermined value of signals corresponding to the selection, the count being in at least two denominations, on or some of which selects the row in one direction (e.g., vertical) and the other of which selects the row in the other direction (e.g., horizontal). The counting may be accomplished by a pair of counting tubes or of counting chains, one for each of two denominations, one for each said direction, with a carry-over from one tube or chain to the other.

With combination signals each combination is regarded as a binary number, and for each signal in a combination which is sensed a corresponding value is counted, the respective values being totalized in the counter to provide a decimal number representative of the combination.

In accordance with another feature of the persent invention, the said counting and the energizing of the correspondingly selected windings are carried out in successive sensing periods and a comparing means is provided whereby the sensing of the same combination in two succeeding rows gives rise to a delay period between the successive energizing of the windings, whereas the sensing of two succeeding combinations which differ gives rise to no delay.

In order that the present invention may be readily carried into effect, it will not be described with reference to the accompanying drawings, wherein:

FIG. 1 illustrates the sensing of a punched tape for operation of an assembly of one hundred contacts. The assembly may be in an adaptor placed over the keyboard of, for example, a line-composing machine to operate corresponding keys, or placed under the keyboard for a similar purpose, or it may replace a normal keyboard.

Figure 1:
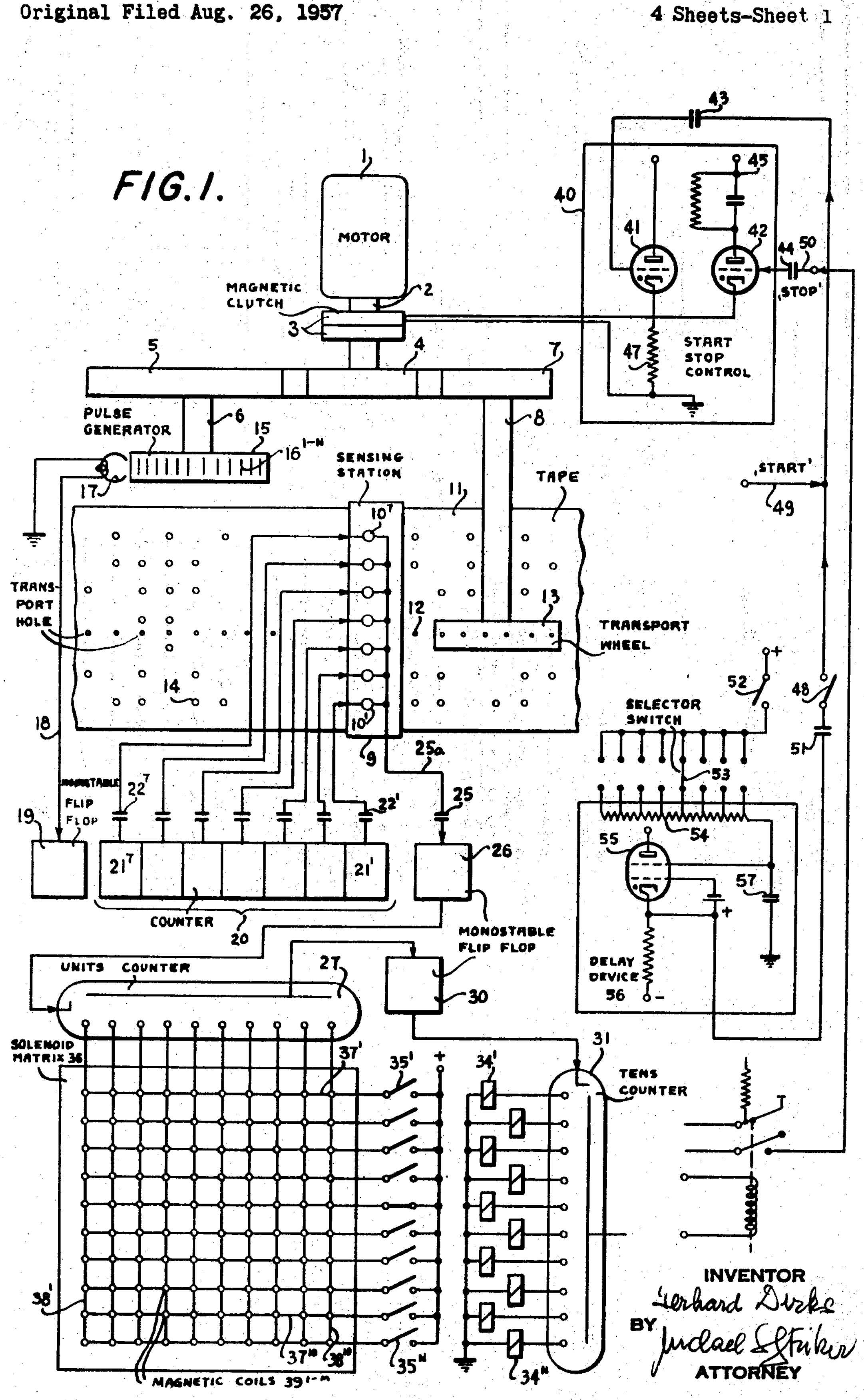
FIG. 1 is a schematic diagram of an embodiment of a control circuit between a punched tape sensing means and a contact assembly having its contacts in a crosswise arrangement of horizontal and vertical rows, these contacts controlling the means (not shown) which are to be selectively operated.

The apparatus comprises a motor 1 driving a shaft 2, which shaft is coupled with a gear 4 through a magnetic clutch 3 which is controlled by the electronic discharge arrangement 40 as hereinafter described. The gear 4 effects a stepwise drive operating the gear 5 on axis 6 and the gear 7 on the axis of a shaft 8.

The sensing station 9 with sensing means $10^{1-7}$ (for example, in the form of pins or sensing brushes) is arranged above the tape 11. The tape 11 is provided with signals in transverse rows and has seven longitudinal code channels for combination signals in a seven code combination in said transverse rows. The tape 11 has transport holes 12 in which the transport wheel 13, driven by a gear 7, engages, to advance said tape stepwisely. In the code channels are perforated holes 14, within the respective transverse rows, and the possible number of code combinations is sufficient at least for 100 keys from which the selections are to be made.

A wheel 15 has pulse generating means $16^{1-n}$ arranged around its circumference. The circumference of the wheel 15 may be of non-magnetic material into which slots are cut to receive and hold small permanent magnets arranged around the circumference, so that these magnets may be sensed successively by a sensing head 17 during the relative movement between said circumference and said sensing head.

The signals sensed by head 17 generate pulses on the lead 18 which are fed to monostable flip-flop 19. This, in consequence delivers pulses to the seven stage counting chain 20 having stages $21^{1-7}$. The chain 20 may be a flip-flop chain of known type. It may, however, be of other type, such as, for example, cold cathode tubes, or magnetic core chains, or of similar type. To each such stage $21^{1-7}$ is connected the respective sensing means $10^{1-7}$ of the different code channels, the connection being through leads which include capacitors $22^{1-7}$.

Pulses delivered from the monostable flip-flop 19 enter the counting chain at the lowest stage $21^7$. Within the same time period in which the flip-flop of counting stage $21^7$ is switched over 64 times, stage $21^6$ will be switched over 32 times, stage $21^5$ will be switched over 16 times and so on. Finally, stage $21^1$ will have only one change-over during such time period.

The function of the counter 20 is to generate trains of pulses for application to the sensing elements $10^{1-7}$ in such a way that a number of pulses appear on line **25*a* equal to the binary value of the particular code combination which is being sensed by the sensing elements. The ratio of the gearing between the shafts 6 and 8 and the positioning of the pulse generator elements $16^{1-n}$ is such that one hundred and twenty-eight pulses occur in lead 18 during the time when one transverse row of perforations in the tape 11 is beneath the sensing elements $10^{1-7}$. The monostable flip-flop 19 merely reshapes these pulses for application to the counter 20. The capacity of the counter 20** is one hundred and twenty-eight, since it has seven binary stages in cascade. The counter therefore goes through one complete cycle operation for each code combination which is sensed by the sensing elements $10^{1-7}$.

The stage $21^7$ of the counter 20 will be switched on sixty-four times during the cycle of operation and will produce a corresponding number of output pulses which are fed via capacitor $22^7$ to sensing element $10^7$. If there is a perforation in the position sensed by the sensing element $10^7$, this element completes a circuit to the line **25*a*. This allows the sixty-four pulses produced by the counter stage $21^7$ to be fed via the sensing element $10^7$, line 25*a* and capacitor 25, to the input of monostable flip-flop 26. Conversely, if there is no perforation in this position, the tape 11 insulates the sensing element $10^7$ from the line 25*a* and no pulses pass from the counter stage $21^7$ to the flip-flop 26**.

The stage $21^6$ applies thirty-two pulses to sensing element $10^6$, the stage $21^5$ applies sixteen pulses to sensing element $10^5$, and so on. These pulses are passed or not to the line **25*a* in accordance with whether or not a perforation is being sensed by the corresponding sensing element. In this way, the line 25*a* receives, during the sensing of one code combination from the tape, a number of pulses equal to the value of that code combination, where the positions sensed by the elements $10^1$, 102**, $10^3$, etc. are given the values of 1, 2, 4, etc.

Figure 3:
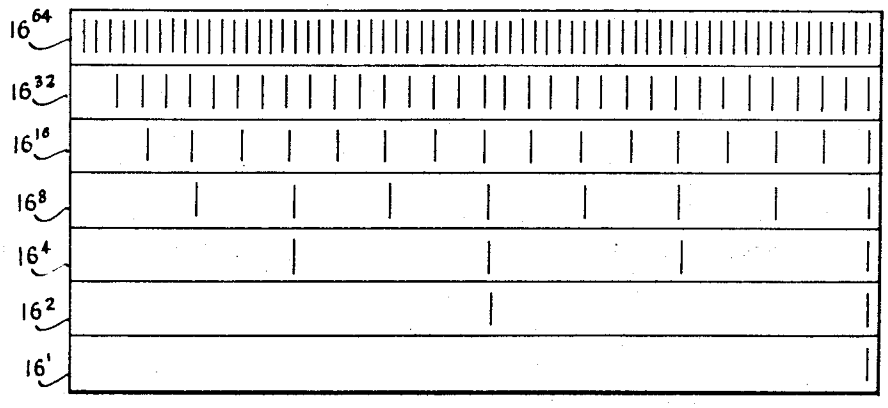
FIG. 3 is a timing diagram illustrating the sequence of sensed signals in the embodiment of FIG. 1.

The inherent switching time of the stages of the counter 20 causes the output pulses from the different stages to be relatively staggered in time (see FIG. 3). Thus, although a single pulse from the flip-flop 19 may produce output pulses from several stages of the counter 20, such output pulses are not simultaneous and may be combined on the line **25*a*** without mutual interaction.

The monostable flip-flop 26 operates the gas discharge tube counting device 27 (which may be a Dekatron) in such a way that each input pulse will move the glow discharge from one stage to the next. If, for instance, there is a hole in the lower (first) code channel and in the third code channel, the counting tube 27 would receive within the time of the sensing cycle for one transverse row, five pulses, that is, the sum of 1 plus 4 pulses. The counting tube 27 is operated in a known way so that a switching over from one cathode to the next takes place if a pulse is received from the monostable flip-flop 26. The glow discharge between the anode and one of the cathodes therefore switches from cathode to cathode in dependence on the delivery of the pulses.

From the last stage of the counting tube 27 there is a connection to the carry-over monostable flip-flop 30 connecting the counter 27 with another counter 31. It is evident that instead of Dekatron tubes other counters may be employed, such as discharge tubes of certain types connected in an arrangement such as is shown in more detail in FIG. 2.

The carry-over device 30 receives a pulse at each tenth pulse delivered to counting tube 27, as only the last stage of tube 27 is connected with said carry-over device. The carry pulses operate the counting arrangement 31, which comprises a further multi-cathode gas discharge counting tube. The circuit of each cathode of counter 31 includes one of the relay coils $34^{1-n}$ operating the respective relay contacts or switches $35^{1-n}$ in such a way that each contact is closed when the coresponding cathode of the counter is conductive, all other cathodes then being non-conductive and all other contacts 35 being open.

The switches $35^{1-n}$ may complete switching circuits through the horizontal rows $37^{1-10}$ of the key magnet coils or windings $39^{1-m}$ in the solenoid matrix or keyboard assembly 36 which, as hereinbefore explained, may be a keyboard, keyboard adaptor or otherwise. In the horizontal rows $37^{1-10}$ there are arranged windings in such a way that each magnet has one winding $39^{1-m}$ connected through the respective switch $35^{1-n}$ to the common positive polarity terminal, and another winding controlled from counting tube 27, the ten stages of which have respective outputs leading in parallel to the vertical rows $38^{1-10}$. The double windings provide a crosswise control of the keyboard magnets. Each of the magnets is operable by the closing of a switch 35 in the respective horizontal row and the ignition of a discharge stage of counting tube 27 in a vertical row. Therefore, only one of the magnet coils $39^{1-m}$ will be energized at any one time, in dependence on the coincident excitation of the two counting arrangements 27 and 31. In FIG. 1, the switch $35^5$ is shown in the closed position. The connections may be made through amplifier triodes or the like, in dependence on which type of counting tubes 27 and 31 are used. The tubes 27 and 31 therefore represent a two-denomination number of which the "units" symbolize a vertical input into the assembly and the "tens" symbolize a horizontal input into the assembly.

The magnetic clutch 3 is under the control of the start and stop arrangement indicated generally at 40 (FIG 1). This start and stop arrangement comprises the discharge tubes 41 and 42. Discharge tube 41 is ignited by a start signal delivered to its grid through capacitor 43, for example, from the input lead 48 marked "Start" in FIG. 1 or through the switch 48 in the closed position. The discharge tube 42 is ignited by a stop signal delivered to its grid through capacitor 44 from the input lead 50 marked "Stop" in FIG. 1. In the circuit of discharge tube 41 is the cathode resistor 47 connected with the magnet coil within the magnetic clutch arrangement 3, so that this clutch is operative to engage the drive when energized by the igniting of discharge tube 41 under the control of a start signal.

The stepwise drive or transport wheel 13 will move tape 11 stepwisely below the sensing means $10^{1-7}$ until in any particular transverse row signals are sensed for effecting a stoppage of said tape. This stoppage is brought about because within the coil arrangement $39^{1-m}$ of the keyboard assembly 36 there is arranged a relay coil instead of a direct control coil for a key magnet, whereby the corresponding key is not directly energized but, first, there is energized the said relay which has a contact to energize said key magnet coil, to operate that key, and which also has a contact delivering current to the input lead 50. This effects the delivery of a pulse through capacitor 44 to discharge tube 42, which ignites discharge tube 42 with the consequent extinguishing of discharge tube 41 because positive polarity terminal 46 has a higher potential than the anode of discharge tube 41. Discharge tube 42 will extinguish itself after discharging capacitor 45.

Such a stop signal is delivered from the keyboard for all those pulse combinations in which the usual stepwise tape transport from one transverse row to the next is to be interrupted to provide a necessary delay before the actuation of the next key. Some of these key operations will release certain functions which require a delay of for instance one, two, five, ten or up to twenty normal stepping times of the tape feed. These delays are under the control of a delay arrangement shown generally at 56 and comprising capacitor 57, discharge tube 55, and the resistor 54 which has a plurality of tapping points. The delay device 56 is used in all those cases in which there is to be an automatic switching in of the stepwise feed after a predetermined delay period.

If there is a device which has no automatic switching in after predetermined delay periods, but in which another switch is to be operative, such switch will deliver a pulse after the intervening operation has taken place, the pulse going to capacitor 43 at the "start" input lead 49. Thereupon, the tape feed and the sensing of the combination signals recommences and continues as hereinbefore described.

The start pulse could, for example, be delivered by the operation of the elevator of a line-composing machine. The movement of the elevator may be started by the closing of a contact at the respective selected relay coil in the field of magnet coils $39^{1-m}$, operating the respective key of the keyboard, and the tape feed be stopped at the same time by the delivering of a pulse from this relay contact to the "stop" lead 50. Upon the arrival of the said elevator at its upper position, a signal is delivered to the "start" lead 49 and the mechanism starts anew.

But at other parts of such a machine there may be time periods required for other operations. These are effected by closing contact 52 which makes connection with one or other of the tapping points of resistor 54 by selector switch 53. Therefore, the current from the positive polarity terminal passes through closed switch 52 and the respective tapping point of the resistor 54 to the capacitor 57, which is charged at a rate depending upon the position of switch 53, to measure a time period sufficient to ignite discharge tube 55 at the desired instant. The tube 55 is prebiassed to a predetermined extent so that capacitor 51 receives a pulse when the voltage on capacitor 57 has risen sufficiently to ignite tube 55. The pulse reaching capacitor 51 may be led through the closed contact 48 to the capacitor 43 to ignite discharge tube 41 thereby to start the tape feed and the sensing anew. Switch 48 must remain closed in order to provide a continuous-operating device.

Figure 2:
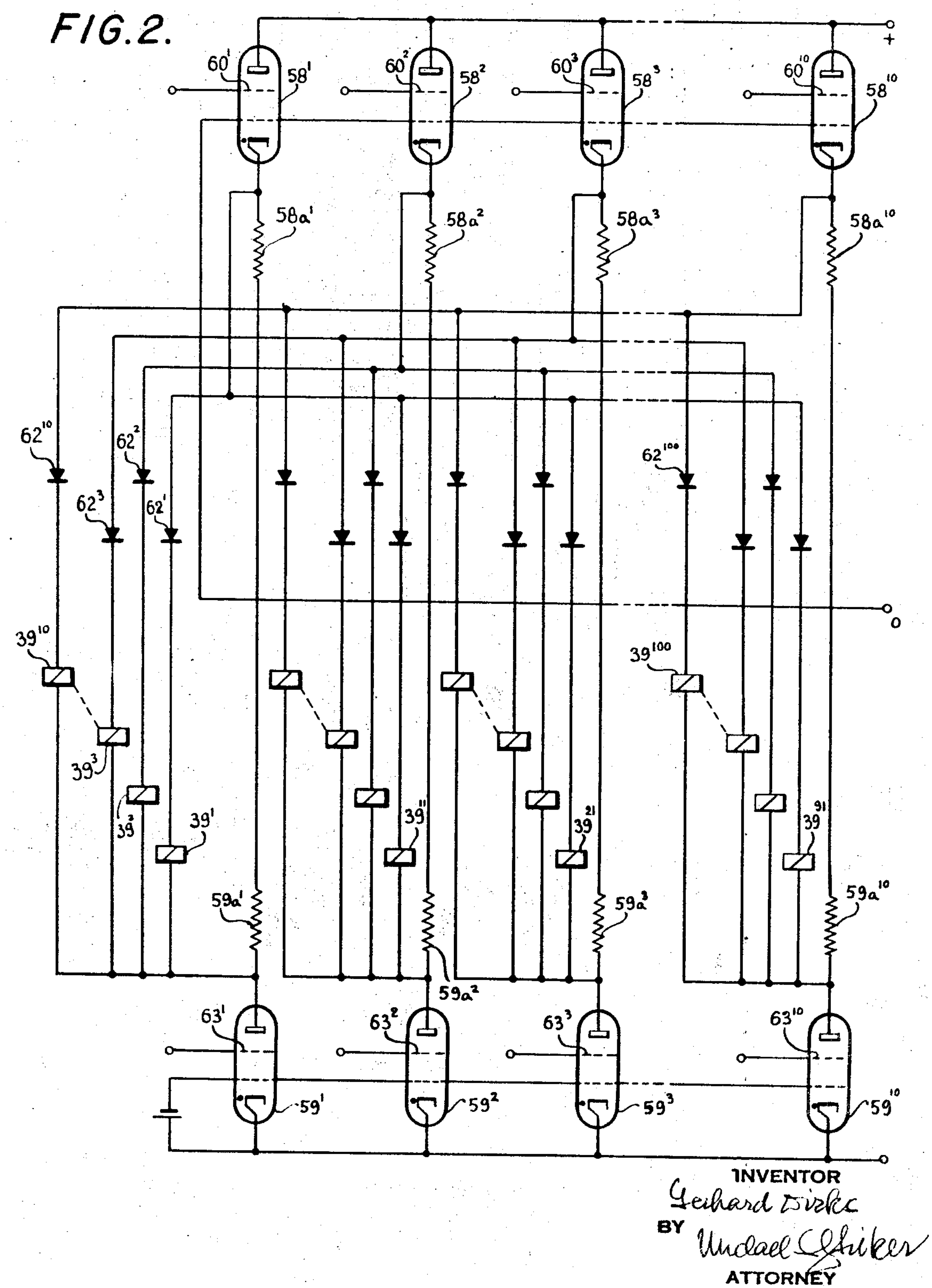
FIG. 2 is a schematic diagram of an embodiment of a selection circuit utilizing discharge tubes for the selection of contacts in the embodiment of FIG. 1.

FIG. 2 illustrates the selecting device for the different relay coils in the crosswise arrangement $39^{1-m}$. Two sets of discharge tubes $58^{1-10}$ and $59^{1-10}$ are used. These may be either discharge tubes connected in a counting chain according to the counting stages of the arrangements 27 and 31, or they may be controlled by said counting stages respectively. The ignition of discharge tubes $58^{1-10}$ takes place by a pulse to control grids $60^{1-10}$ of said last-mentioned tubes whereas the ignition of any one of the discharge tubes $59^{1-10}$ takes place by delivering a pulse to the control grids $63^{1-10}$ of said last-mentioned tubes. These sets of discharge tubes are negatively prebiassed by a second control grid. The upper set of discharge tubes $58^{1-10}$ is arranged between a plus potential of for instance 250 volts and zero potential 0, while the lower set of discharge tubes $59^{1-10}$ is arranged between zero potential 0 and a negative potential of for instance —250 volts. In the cathode circuit of each of the discharge tubes $58^{1-10}$ is a cathode resistor **58*a*** which has a relatively high value. These are shown at $58a^{1-10}$ and are used to complete a discharge circuit for the respective tubes $58^{1-10}$. Likewise there is in the anode circuit of each of the discharge tubes $59^{1-10}$ the relatively high value resistor $59a^{1-10}$ completing the discharge circuits for these tubes.

Between the two rows of discharge tubes there are connected the coils $39^{1-m}$ forming, according to FIG. 1, coils actuating the respective keys of the keyboard adaptor or the like 36 and also relay coils operating such keys indirectly to control delay arrangements as hereinbefore explained. Furthermore, there are interconnections between the first row of discharge tubes $58^{1-10}$ and the second row of tubes $59^{1-10}$ which lead respectively each through one of said windings of said coils $39^{1-m}$ and there is a diode $62^{1-m}$ interconnected in each of the said connections between one discharge tube in the row $58^{1-10}$ and one of the discharge tubes in the row $59^{1-10}$.

The discharge tubes $58^{1-10}$ may make the vertical selection according to the vertical rows in the arrangement in FIG. 1, whereas the tubes $59^{1-10}$ may make the horizontal selection according to said arrangement. There is only one switching circuit between any one of the discharge tubes $58^{1-10}$ and any one of discharge tubes $59^{1-10}$, this going through a corresponding one of the one hundred coils $39^{1-m}$. There is, for instance, upon ignition of discharge tubes $58^{1}$ and tube $59^{1}$, a switching circuit from the positive polarity terminal through the anode of discharge tube $58^{1}$ to its cathode and from there through the diode $62^{1}$ to the winding $39^{1}$ to the anode of discharge tube $59^{1}$, and from there through the cathode to the negative polarity terminal. If only the tubes $58^{1}$ and $59^{1}$ are ignited, only the coil $39^{1}$ is energized.

If, instead of discharge tubes $58^{1}$ and $59^{1}$, the discharge tube $58^{2}$ and the discharge tube $59^{1}$ are ignited, the connection would be from the positive polarity terminal through discharge tube $58^{2}$, through diode $62^{2}$, to coil $39^{2}$ and then to the anode of discharge tube $59^{1}$., and from its cathode to the negative polarity terminal. If, instead, discharge tube $58^{3}$ and discharge tube $59^{1}$ are ignited there would be a current from the positive polarity terminal through the ignited discharge tube $58^{3}$, through diode $62^{3}$ and coil $39^{3}$ to the anode of discharge tube $59^{1}$ and from its cathode to the negative polarity terminal. It is evident, therefore, that by selecting only two of the said ten discharge tubes, one in each set, any one coil of the said one hundred coils $39^{1-m}$ may be selected for excitation to operate the corresponding key or to effect whatever other one hundred functions are represented by the assembly $39^{1-m}$. If the rows of discharge tubes $58^{1-10}$ and $59^{1-10}$ are to be controlled by counting tubes having only low currents in their different stages, for example, if they are of the cold cathode type, then the switches are prepared to allow an ignition of only one of the tubes $58^{1-10}$ and $59^{1-10}$, respectively, if the said counting tubes have already taken their respective anode positions for the sensed transverse row in dependence on the respective holes in the different code channels of the tape.

Figure 4:
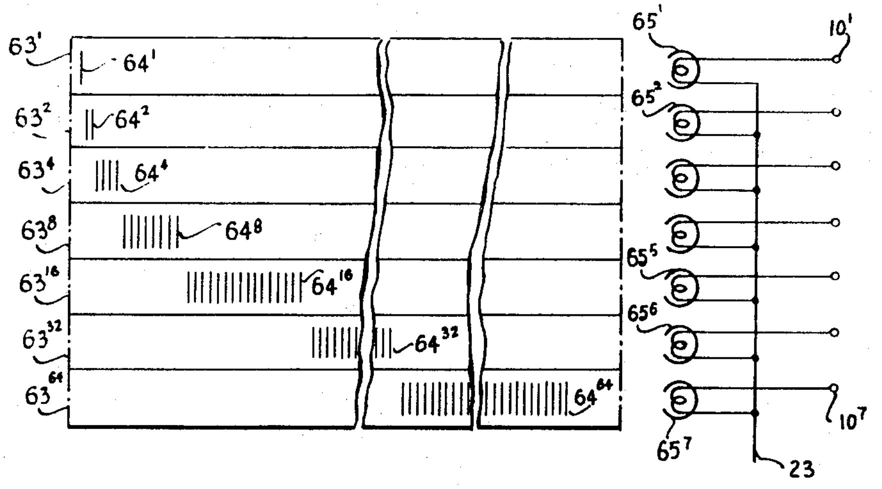
FIG. 4 is a diagram illustrating an alternative arrangement of stored counting signals for use as hereinafter described.

FIG. 4 shows another arrangement for delivering pulses under control of the sensing elements $10^{1-7}$, the pulses for the several channels in this case being generated in series. This arrangement may also be used for the delivery of pulses in a device according to FIG. 5.

The generation of these pulse sequences is illustrated in FIG. 4 under the control of rotary record element 99 (shown in FIG. 4 as a development) having one signal $64^1$ in the track $63^1$, two signals $64^2$ in the track $63^2$, four signals $64^4$ in the track $63^4$, eight signals $64^8$ in track $63^8$, sixteen signals $64^{16}$ in track $63^{16}$, thirty two signals $64^{32}$ in the track $63^{32}$ and sixty four signals in track $63^{64}$. However, the signals in each track are arranged between those in the preceding and in the succeeding track so that, in a complete sensing of the record during one rotation, first the sixty-four signals $64^{64}$ are sensed by sensing head $65^7$ and immediately afterwards the sensing by sensing head $65^6$ of the thirty two signals $64^{32}$ in track $63^{32}$ begins, and so on, so that after the sensing of the two signals $64^2$ by sensing head $65^2$ the last signal to be sensed is the one signal $64^1$ in track $63^1$, sensed by sensing head $65^1$.

Figure 5:
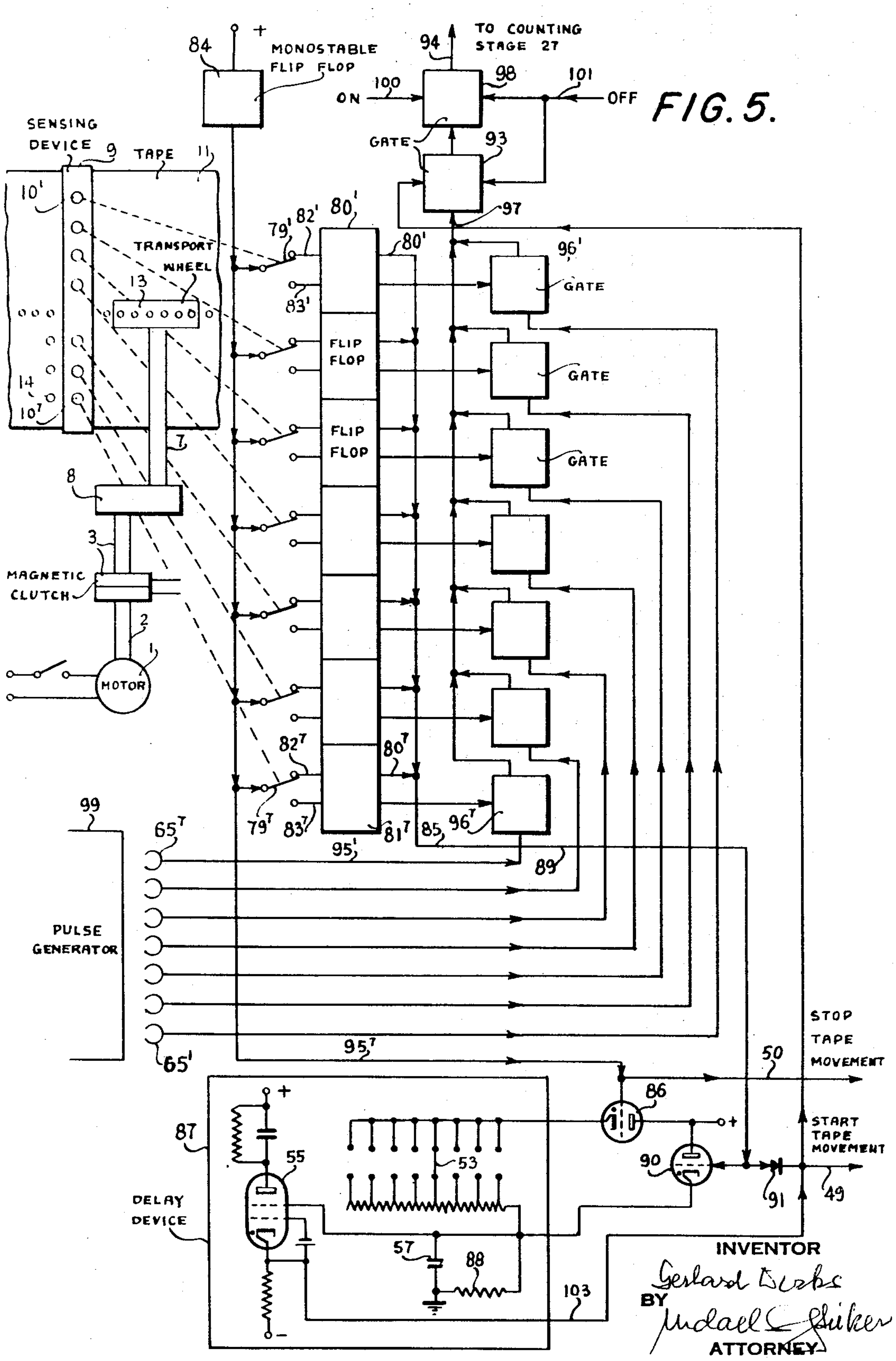
FIG. 5 is a schematic diagram of a modification of the control circuit of FIG. 1, in which a comparison and delay circuit are utilized.

Referring now to FIG. 5, an arrangement is shown in which a pulse generator according to FIG. 4 is used. This arrangement includes the motor 1 which operates the stepwise drive gear 8 from shaft 2 through magnetic clutch 3. Further, there is a sensing device 9 with sensing elements $10^{1-7}$ for sensing the holes 14 punched in tape 11. The transport wheel or driving device 13 for this tape 11 is operated from said stepwise drive 8 through shaft 7. By means not shown in the drawing, but well known in the art, the contacts $79^{1-7}$ may be operated by the sensing elements $10^{1-7}$. Thus, for example, the contacts $79^{1-7}$ are operated by pins entering into the holes 14 or the sensing elements $10^{1-7}$ may be built up as brushes for controlling relays and these relays may operate the contacts $79^{1-7}$.

The switching over of contacts $79^{1-7}$ is effected in combinations, as in FIG. 1, but there is an essential difference between the arrangements of FIGS. 1 and 5 in this respect. There is provision for an automatic delay in both cases, but in FIG. 1 the automatic delay is controlled by the machine itself whereas FIG. 5 shows a special case where the delay is controlled by identity between two successive combinations sensed. In the case of FIG. 5, a combination sensed is stored in the flip-flops $81^{1-7}$, and the position or setting of these flip-flops $81^{1-7}$ is compared with the position of contacts $79^{1-7}$ after the sensing of the next following combination. The flip-flops $81^{1-7}$ are built up so that if any one of these flip-flops is switched over corresponding positive pulses are produced in output leads $80^{1-7}$. The comparison between two combinations is effected in the following manner. Contacts $79^{1-7}$ are set by the sensing elements $10^{1-7}$ and the monostable flip-flop 84 produces a positive pulse which is delivered to the several contacts $79^{1-7}$ and to the corresponding input leads $82^{1-7}$ or $83^{1-7}$ according to the position of the contacts $79^{1-7}$. Thereby flip-flops $81^{1-7}$ are switched over to positions corresponding to the combination just sensed. The positive pulse delivered from the monostable flip-flop 84 is also delivered through lead 85 to the grid of the gas discharge tube 86, igniting it. The delay device 87, which was described in connection with FIG. 1 as a delay device 56, is then started. The pulse from lead 85 is delivered to the stop lead 50, thus stopping the transport tape 11. The resistance 88 which is in parallel with capacitor 57 is so high that the time constant of capacitor 57 and resistor 54 is not appreciably affected.

If, after the delivery of pulses on leads $82^{1-7}$ or $83^{1-7}$ one or more of the flip-flops $81^{1-7}$ switches over, then on the respective leads $80^{1-7}$ positive pulses are induced which are delivered to the grid of gas discharge tube 90 through lead 89. The tube 90 ignites and effectively short circuits the gas discharge tube 86 and resistance 54, so that capacitor 57 is charged very quickly.

The pulse from lead 89 is delivered through diode 91 to the "start" lead 49 to restart the transport of tape 11. The ignition of tube 90 follows so quickly upon the operation of tube 86 that there is actually no interruption in the tape feed. From the diode 91 this pulse is also delivered on lead 92 to controllable gate 93 making it conductive. Controllable gate 93 is connected in the circuit path from signal heads $65^{1-7}$ (compare FIG. 4) to lead 94 to counting stage 27. The signal heads $65^{1-7}$ are connected to the respective inputs of the controlled gates $96^{1-7}$ by leads $95^{1-7}$. The controlled gates $96^{1-7}$ are controlled by the flip-flops $81^{1-7}$ in such a way that if the respective contact $79^{1-7}$ is switched over by a hole 14 in tape 11, then the respective controllable gate $96^{1-7}$ is conductive so that pulses from the respective signal head $65^{1-7}$ may be delivered to the common output lead 97 of the gates $96^{1-7}$. These pulses will be delivered through the conductive gate 93 to the controllable gate 98. At the beginning of each rotation of the signal carrier 99, a positive pulse is delivered to the controllable gate 98 on lead 100, to make it conductive. The pulses from lead 97 may pass through the gate 98 to output lead 94 and from there they may be delivered to counting stage 27. The total number of pulses corresponds to the decimal value of the combination sensed from the respective row on tape 11. The selection of one of the magnet coils $39^{1-m}$ shown in FIG. 1, may be effected by these pulses in a manner as described with reference to FIG. 1.

As shown in FIG. 4, the pulses in the various tracks on signal carrier 99 are so arranged that the signal heads $65^{1-7}$ operate in succession. Therefore, pulses which pass those of the gates $96^{1-7}$ which at any time are open, are delivered to the output lead 94 in successive groups, representing a totalization, or decimal value of the combination in the chain $81^{1-7}$. At the end of one rotation of the signal carrier 99 a pulse is delivered to the controllable gates 93 and 98, on lead 101, which makes both these gates non-conductive so that only the pulses induced in the signal heads $65^{1-7}$ during one rotation of the signal carrier 99 may pass to lead 94.

If during the sensing of the next combination the contacts $79^{1-7}$ are set in the same positions as during the sensing of the previous combination, then the delivery of pulses from the monostable flip-flop 84 to the respective input leads $82^{1-7}$ or $83^{1-7}$ effects no switching over of the flip-flops $81^{1-7}$ so that no pulse is induced on lead 89. In this case, a pulse is produced only on lead 85, which ignites tube 86 in the described manner so that delay device 87 is made operative. This pulse is applied simultaneously to lead 50 to effect the stoppage of the transport of tape 11.

Capacitor 57 in the delay device 87 charges through resistor 54 and gas discharge tube 55 will eventually be ignited so that a pulse is produced in lead 103. This pulse is delivered to the "start" lead 49 to give a signal for the restarting of tape 11. This pulse from lead 103 is delivered also to lead 92 and therefore allows signal carrier 99 to deliver pulses during the next rotation from signal heads $65^{1-7}$ to lead 94 according to the then switching position of the flip-flops $81^{1-7}$.

What I claim is:

1. A system for furnishing a visual output signal corresponding to an input signal, comprising, in combination, a voltage source furnishing at a first and second voltage terminal, respectively, a first and second voltage; a plurality of magnetic field creating means, each of said means consisting of a coil and unidirectional conducting means series connected therewith; a plurality of first switching means each connected between said first voltage terminal and corresponding magnetic field creating means, and a plurality of second switching means each connected between said second voltage terminal and associated magnetic field creating means, in such a manner that current flows only through magnetic field creating means connected to an activated one of both said first and said second switching means, thereby creating a magnetic field in a region proximate to said so-connected magnetic field creating means; input signal means associated with said first and second switching means for selectively activating a selected one of said first plurality of switching means and a selected one of said second plurality of switching means, depending upon the character of said input signal; and indicating assembly including a plurality of components, each of said components being located in the region proximate to one of said magnetic field creating means so as to be directly activated by the electromagnetic force created by said magnetic field creating means upon actuation of said selected one of said first and said selected one of said second switching means, whereby each of said components will furnish a visual output signal corresponding to an input signal.

2. A selection circuit as set forth in claim 1 wherein each of said unidirectional conducting means comprise a diode.

3. A selection circuit as set forth in claim 2 wherein each of said diodes is a semiconductor diode.

References Cited

UNITED STATES PATENTS

| | | | |
|---|---|---|---|
| 2,066,750 | 1/1937 | Tripp | 235—61.67 |
| 2,258,405 | 10/1941 | Buckley | 197—20 |
| 2,575,017 | 11/1951 | Hunt | 197—1 X |
| 2,825,889 | 3/1958 | Henle | 340—166 |
| 2,931,014 | 3/1960 | Buchholz et al. | 340—172.5 |
| 2,716,230 | 8/1955 | Oliwa | 340—345 |
| 2,992,410 | 7/1961 | Groth et al. | 340—166 |
| 3,058,094 | 10/1962 | Spingies et al. | |
| 3,223,979 | 12/1965 | Dirks | 340—172.5 |
| 2,142,252 | 1/1939 | Nunan | 235—61.67 |
| 2,195,080 | 3/1940 | DeSimone | 235—61.67 |
| 3,012,096 | 12/1961 | Steinmetz et al. | 178—17 |
| 3,033,448 | 5/1962 | Quinn | 235—61.115 |
| 3,089,058 | 5/1963 | Condy et al. | 235—92 |
| 3,109,925 | 11/1963 | Wood | 235—61.11 |
| 3,119,950 | 1/1964 | Somlyody | 235—92 |
| 3,139,613 | 6/1964 | De Negri | 340—347 |
| 3,165,730 | 1/1965 | Robinson | 340—347 |
| 3,209,209 | 9/1965 | Mueller | 317—101 |

DARYL W. COOK, Primary Examiner

R. M. KILGORE, Assistant Examiner

U.S. Cl. X.R.

197—20; 235—61.11